(12) United States Patent
Nimashakavi et al.

(10) Patent No.: US 9,009,787 B2
(45) Date of Patent: Apr. 14, 2015

(54) SYSTEM AND METHOD OF MAPPING AND PROTECTING COMMUNICATION SERVICES WITH OAUTH

(75) Inventors: Kirankumar Nimashakavi, Fremont, CA (US); Ting Lou, Beijing (CN); Guang Yang, Beijing (CN); Tao Cui, Beijing (CN)

(73) Assignee: Oracle International Corporation, Redwood Shores, CA (US)

( * ) Notice: Subject to any disclaimer, the term of this patent is extended or adjusted under 35 U.S.C. 154(b) by 282 days.

(21) Appl. No.: 13/557,478

(22) Filed: Jul. 25, 2012

(65) Prior Publication Data

US 2014/0033280 A1   Jan. 30, 2014

(51) Int. Cl.
*H04L 29/06* (2006.01)
*G06F 21/62* (2013.01)

(52) U.S. Cl.
CPC .............. *H04L 63/10* (2013.01); *G06F 21/62* (2013.01); *H04L 63/0807* (2013.01)

(58) Field of Classification Search
USPC ............................................................ 726/9
See application file for complete search history.

(56) References Cited

U.S. PATENT DOCUMENTS

| 2011/0093925 | A1 | 4/2011 | Krishnamoorthy et al. |
| 2011/0179272 | A1 | 7/2011 | Klos et al. |
| 2011/0225643 | A1* | 9/2011 | Faynberg et al. ............... 726/10 |
| 2011/0265172 | A1 | 10/2011 | Sharma et al. |
| 2012/0117626 | A1* | 5/2012 | Yates et al. ......................... 726/4 |
| 2012/0208495 | A1* | 8/2012 | Lawson et al. ................ 455/406 |
| 2012/0226611 | A1* | 9/2012 | Radia et al. ..................... 705/44 |
| 2013/0007846 | A1 | 1/2013 | Murakami et al. |
| 2013/0268680 | A1* | 10/2013 | Marton et al. ................ 709/226 |
| 2014/0007198 | A1* | 1/2014 | Durbha et al. .................... 726/4 |
| 2014/0040993 | A1* | 2/2014 | Lorenzo et al. ................... 726/4 |

* cited by examiner

*Primary Examiner* — Joseph P Hirl
*Assistant Examiner* — Chi Nguy
(74) *Attorney, Agent, or Firm* — Meyer IP Law Group

(57) ABSTRACT

In accordance with various embodiments, systems and methods which allow mapping and protecting communication services and granular access to subscriber information. Such a system can include a plurality of applications, executing on one or more application servers. The system can also include a services gatekeeper which is operable to intercept requests for access to communication services, obtain scoped authorization from a subscriber for access to specified communication services, and enable access to the specified communication services in accordance with the scope authorized by the subscriber.

18 Claims, 3 Drawing Sheets

SYSTEM AND METHOD OF MAPPING AND PROTECTING COMMUNICATION SERVICES WITH OAUTH

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates to a system and method of mapping and protecting communication services and in particular to a services gatekeeper system and method for supporting granular authorization of third party access to communication services.

CROSS-REFERENCES TO RELATED APPLICATIONS

This application is related to all of the following patent applications, all of which are incorporated herein by reference in their entireties, including all Appendices filed therewith:

U.S. patent application Ser. No. 13/557,474, filed on Jul. 25, 2012, now U.S. Pat. No. 8,806,595, issued on Aug. 12, 2014, entitled "SYSTEM AND METHOD OF SECURE SHARING OF RESOURCES WHICH REQUIRE CONSENT OF MULTIPLE RESOURCE OWNERS USING GROUP URI'S" by Nimashakavi, et al.; and U.S. patent application Ser. No. 13/557,476, filed on Jul. 25, 2012, now U.S. Pat. No. 8,782,411, issued on Jul. 15, 2014, entitled "SYSTEM AND METHOD OF EXTENDING OAUTH SERVER(S) WITH THIRD PARTY AUTHENTICATION/AUTHORIZATION" by Nimashakavi, et al.

BACKGROUND

The application programming interfaces (APIs) of communication services expose subscriber information such as charging capability, location, and profile to third party applications. For API providers, this creates legal and security issues. Currently, no solution enables secure sharing of APIs with subscriber consent. Moreover, typically, if a subscriber wants to consent to access to their information by a third party application, they have to give full access to the third party application and there is no solution that enables the subscriber to grant limited access of a defined scope.

Open Authorization Protocol (OAuth) is an open standard for authorization. OAuth allows users to, for example, share their private resources (e.g. photos, videos, contact lists) stored on one site with another site without having to hand out their credentials, typically supplying username and password tokens instead. Each token grants access to a specific site (e.g., a video editing site) for specific resources (e.g., just videos from a specific album) and for a defined duration (e.g., the next 2 hours). This allows a user to grant a third party site access to their information stored with another service provider, without sharing their access permissions or the full extent of their data. However, the OAuth protocol is insufficient for secure scoped sharing of communication services in a telecommunications network.

SUMMARY

In accordance with various embodiments, services gatekeeper systems and methods of mapping and protecting communication services are provided. Such systems can include a plurality of applications, executing on one or more application servers. The system can include a services gatekeeper system and method for supporting granular authorization of communication services access utilizing OAuth.

Embodiments of the present invention provide a flexible mapping structure which can be used to map a plurality of different communication services to provide scoped access to subscriber information. This scoped access allows the subscriber to provide access to specific portions of their information, e.g., provide access to only location information or charging information, without providing access to all information.

Embodiments of the present invention enable mapping of communication services to scopes and automatically protecting communication services in a fine grained level (API level, method level, parameter level) with OAuth tokens. This solution provides flexible control of the authorization of communication services exposure of subscriber data. The scope of authorization can be defined at fine grain and/or coarse grain levels.

Other objects and advantages of the present invention will become apparent to those skilled in the art from the following detailed description of the various embodiments, when read in light of the accompanying drawings.

DETAILED DESCRIPTION

Figure 1:
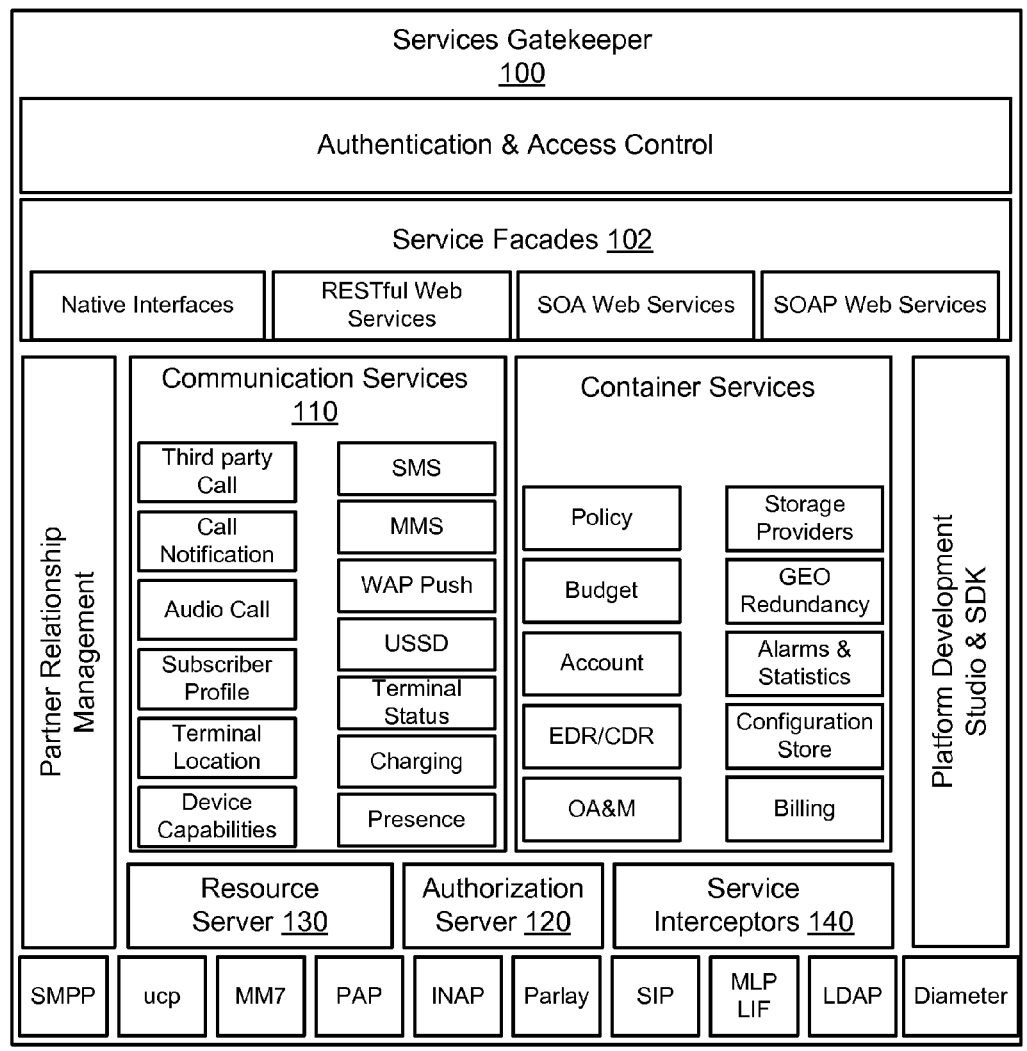
FIG. 1 shows a services gatekeeper, in accordance with an embodiment of the invention.

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is provided for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

Common reference numerals are used to indicate like elements throughout the drawings and detailed description; therefore, reference numerals used in a figure may or may not be referenced in the detailed description specific to such figure if the element is described elsewhere. The first digit in a three digit reference numeral indicates the series of figures in which the element first appears. Likewise the first two digits in a four digit reference numeral.

Communication services APIs expose subscriber resources such as charging capability, location, and profile to third party applications. For telecommunication network providers, this creates legal and security issues. Currently, no solution enables secure sharing of communication services APIs with subscriber consent. Moreover, typically, if a subscriber (resource owner) wants to consent to access to their subscriber resources to a third party (client) application, they have to give full access to the third party application and there is no conventional solution that enables the subscriber to grant limited access of a defined scope. The present invention provides a services gatekeeper system and method of mapping and protecting communication services APIs as OAuth resources in a telecommunications network. In order to expose these subscriber resources securely, the services gatekeeper system includes a mechanism including a flexible data structure which associates subscribers, communication services APIs exposing subscriber information (subscriber resources), and exposes and protects the communication services using OAuth tokens. The system supports granular authorization of communication services access utilizing OAuth.

The services gatekeeper system maps a communication service into an OAuth resource. The OAuth resource is defined based on the interface and the method of the communication services. An OAuth resource can be defined at a fine grain and/or coarse grain level using a flexible mapping structure. The flexible mapping structure can be used to map a plurality of different communication services to provide scoped access to subscriber information. The scoped access allows the subscriber to provide access to specific portions/aspects of their information, e.g., provide access to only location information or charging information without providing access to all information. Thus, the services gatekeeper system enables mapping communication services to authorization scopes and automatically protecting subscriber data exposed by the communication services APIs with fine granular control (API level, method level, and parameter level) using OAuth tokens. This solution extends the OAuth protocol to provide flexible control of the exposure of subscriber data by communication services APIs.

FIG. 1 shows elements of a services gatekeeper 100 in accordance with an embodiment of the invention. As shown in FIG. 1, services gatekeeper 100 controls access to a plurality of communication services 110. Services gatekeeper 100 facilitates the operator's need to provide third party service provider access to its key value-added network capabilities as well as third party APIs in a controlled, secure, optimized, and automated fashion, while providing robust customization and extensibility. Services gatekeeper 100 delivers a converged service exposure layer, providing operators the choice and flexibility of using Web, Service Oriented Architecture (SOA) or telecommunication interfaces to expose their network capabilities to third party partners. The exposure platform is based on IT, Web and telecommunication industry standards such as Java Platform, Enterprise Edition (Java EE), SOA, Parlay X, Session Initiation Protocol (SIP), Diameter, OAuth, Simple Object Access Protocol, (SOAP), and Representational State Transfer (REST)-ful Web Services.

Services gatekeeper 100 includes pre-built, specialized components called communication services 110 to allow third party developers and application partners to easily access the operator's telecommunication network capabilities. The network capabilities supported by the communication services 110 include messaging, call control, terminal location, payment, profile and presence. Thus, communication services APIs expose subscriber information such as the charging capability, location, and profile to third party applications, and thus require subscriber authorization for access. Services gatekeeper 100 provides flexibility and choice in how third party developers and applications can access the operator's network through multiple types of access interfaces called service facades 102. Service facades 102 supported are traditional SOAP web services, RESTful web services, SOA web services, and native telecommunication interfaces.

Services gatekeeper 100 includes authorization server 120 which provides an authorization service based in part on the OAuth protocol. OAuth is an open protocol which enables third-party applications to obtain access to an HTTP service (OAUTH resource) on behalf of a resource owner by orchestrating an approval interaction between the resource owner and the HTTP service. The conventional OAuth protocol allows controlled access to resources of a resource owner, for example picture files identified by a uniform resource identifier (URI). However the conventional OAuth protocol has no mechanism for controlling access and scope of exposure of communication services APIs, for example communication services 110, such as location and charging. However, authorization server 120 includes extended functionality for controlling access and exposure of communication services 110.

As indicated above, the services gatekeeper 100, also includes a resource server 130 which manages the protected resources (for example communication services 110) contained within a service provider's network. Resource server 130 accepts and responds to third-party application requests for access to protected resources (communication services 110) after the third-party application has obtained authorization using authorization server 120.

The extended functionality of authorization server 120 and resource server 130 allows an application to charge on behalf of the subscriber using a communication service 110 assuming the subscriber has explicitly provided approval for this application to do so. Subscribers retain complete control by authorizing usage of their subscriber resources on a granular, time specific basis, and can revoke this access at any time. Authorization server 120 also supports integration for delegated authentication and authorization enabling subscriber verification through custom communication channels such as SMS and USSD. In addition, authorization server 120 enables operators to offer authentication as a service, thereby allowing subscribers to more easily log into third party applications and websites by using their subscriber ID.

As indicated above, the services gatekeeper 100 includes a system for mapping and protecting communication services 110. The system supports granular authorization of access to communication services 110 utilizing the authorization server 120. Services gatekeeper 100 maps a communication service 110 into the resource that is protected by authorization server 120. The resource mapping is based on the interface and the method of the communication services 110. The resource mapping includes a flexible data structure which includes a plurality of resource identifiers specifying particular communication services APIs where each resource identifier is associated with one or more parameters wherein the resource identifiers and parameters identify the scope of the subscriber information. The resource mapping provides coarse grain and fine grain level control (API level, method level, parameter level) using OAuth tokens. The mapping structure also supports a tree structure of resource definition. Accordingly resources have subresources that further define specific methods. Authorization grants to a resource also apply to its subresources. The scoped authorization is interpreted by service interceptors 140 with respect to access to the communication services 110 which are provided through resource server 130. The combined functions of authorization server 120, resource server 130 and service interceptors 140 allows the subscriber to provide access to specific portions of their information, e.g., provide access to only location information or charging information without providing access to all information. This solution provides flexible control of API exposure of subscriber data using services gatekeeper 100.

As stated above, the flexible data structure supports mapping and protecting of communication services 110 with various levels of control including API level (e.g. charging, presence, location) method level (e.g. charge, query, refund), and parameter level (e.g. $5, $10). Thus, the subscriber can choose which of communication services 110 to expose to a third party, what function of the communication services 110 the third party is allowed to access, and what parameters apply to the third party use of the communication services 110. Authorization granted to a resource also apply to its subresources. For example, for a payment communication service, a resource called amountTransaction can be created for charging transactions. A subresource called checkTransactionStatus is a method used to query the status of a charging transaction. The authorization to check the status of the transaction is implicit in the authorization to charge for the transaction. It is therefore unnecessary to request separate authorization from a subscriber. The tree structure enables, therefore, one authorization to grant an application access to a selected set of subresources of a resource which contains multiple interfaces and methods. Table I, below provides an example of a resource format (structure and attributes) defined in an XML Schema.

TABLE I

Resource Format

| Attributes | Description |
| --- | --- |
| ID | Resource Identifier (required). In the run time, as part of the authorization grant this ID is submitted as the value of the scope parameter. |
| Name | Resource Name (required). Contains the verbal description of a resource which can be used for display purposes. |
| InterfaceName | Plug-in North Interface Name of the Resource (required). |
| MethodName | Plug-in North Method Name of the Resource (required). |
| TokenExpirePeriod | Number of Seconds Until Token Expires (optional). If multiple resources (scopes) are granted with a single token, earliest token expiry will be enforced on the token. If the resource has subresources, then the earliest token expiry time configured among all resources will be used. |
| SubResource | One or more resources that can exist within the scope of the resource defined (optional). Value of this field should be an ID of another resource. |
| Parameter | One or more parameters valid for the resource defined (optional). These parameter(s) will be submitted as part of the OAuth authorization. In the runtime, a resource may take several parameters, where each of the parameters can have two attributes: name and description. |

The meaning of the parameter attribute of the resource format is interpreted by a custom interceptor within service interceptors 140. For example for the following scope value 'chargeAmount?code=123', "chargeAmount" is the resource ID mapped in services gatekeeper 100, "code" represents the parameter name and "123" represents the parameter value. In the above example, as part of communication service access (resource access), a custom interceptor is written to interpret the OAuth token scope and RequestContext and validate the token usage against the authorization scope.

The following is an example of an oauth_resource.xml used to create API payment resources and subresources in services gatekeeper.

Example 1 oauth_resource.xml

```
<?xml version="1.0" encoding="UTF-8"?>
<resources xmlns="http://oracle/ocsg/oauth2/management/xml"
xmlns:xsi="http://www.w3.org/2001/XMLSchema-instance">
<!--
OneAPI Payment
-->
<!-- amountTransaction -->
<resource id="POST-/payment/tel:15415550100/transactions/amount"
name="Charge or refund"
interfaceName="oracle.ocsg.parlayrest.plugin.PaymentPlugin"
methodName="amountTransaction"
tokenExpirePeriod="3600">
<parameter name="code" description="billable item id"/>
<subResource>checkTransactionStatus</subResource>
</resource>
<!-- list amount transactions -->
<resource id="GET-/payment/tel:15415550100/transactions/amount"
name="list amount transaction"
interfaceName="oracle.ocsg.parlayrest.plugin.PaymentPlugin"
methodName="listTransaction"
tokenExpirePeriod="3600">
<subResource>checkTransactionStatus</subResource>
</resource>
<!-- get amount transaction -->
<resource id="checkTransactionStatus" name="Get amount transaction detail"
interfaceName="oracle.ocsg.parlayrest.plugin.PaymentPlugin"
methodName="checkTransactionStatus"
tokenExpirePeriod="3600"/>
<!-- start reservation -->
<resource id="startAmountReservationTransaction"
name="startAmountReservationTransaction"
```

-continued

Example 1 oauth_resource.xml

```
interfaceName="oracle.ocsg.parlayrest.plugin.PaymentPlugin"
methodName="startAmountReservationTransaction"
tokenExpirePeriod="3600"/>
<!-- update reservation: reserve additional, charge reservation, release reservation -->
<resource id="updateAmountReservationTransaction"
name="updateAmountReservationTransaction"
interfaceName="oracle.ocsg.parlayrest.plugin.PaymentPlugin"
methodName="updateAmountReservationTransaction"
tokenExpirePeriod="3600"/>
</resources>
```

Figure 2:
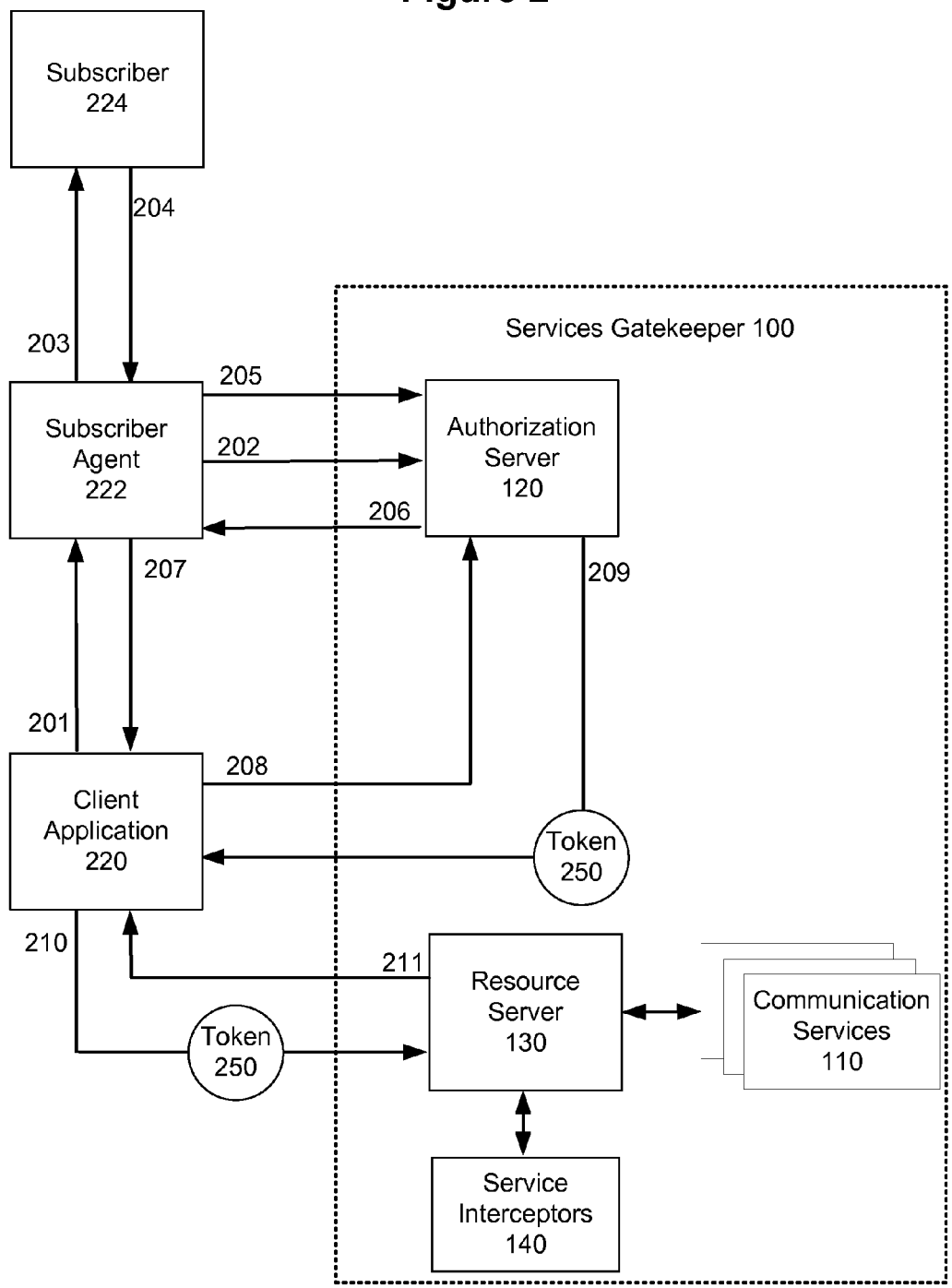
FIG. 2 shows authorization and authentication flow in an authorization and authentication system, in accordance with an embodiment of the invention.

FIG. 2 shows authorization and authentication flow in an authorization and authentication system, in accordance with an embodiment of the invention. FIG. 2 illustrates authorization flow in services gatekeeper 100 whereby access to communication services 110 (for example charging) can be granted to a client application 220 (for example a third party client application) in a secure manner. These communication services 110 are APIs which expose subscriber information such as charging capability, location, and profile to third party applications and thus require subscriber authorization for access. The services gatekeeper 100 provides a system and method by which a client application 220 can access communication services 110 with the permission of the subscriber 224 (subscriber/user).

In general, before the client application 220 can access the communication services 110, it must first obtain an authorization grant from the subscriber 224 and use authorization server 120 to obtain the authorization grant for an access token 250 understood by the resource server 130. The access token 250 is a proxy which replaces different authorization constructs (e.g. username and password) which need not be disclosed to the client application 220. The access token 250 can specify a scope and duration and other parameters. Moreover, the resource server 130 need not interpret and validate diverse authentication schemes as it can rely on the access token 250 alone.

As shown in FIG. 2, the client application 220 (for example a third party client application) initiates the flow when, in operation 201, it directs the subscriber agent 222 of the subscriber 224 to the authorization endpoint of authorization server 120. The client application 220 includes its client identifier, requested scope, local state, and a redirection URI. The authorization endpoint receives and processes requests by client applications for permission to access protected resources such as communication services 110. Generally, the subscriber 224 grants permission by providing a username and password and selecting attributes or services to expose. An authorization code is granted to the client application 220 once permission is obtained from the subscriber 224.

In operation 202, the subscriber agent 222 transmits the request from the client application 220 to the authorization server 120. The authorization server 120 authenticates the subscriber 224 through the subscriber agent 222 and establishes whether the subscriber 224 grants or denies the access request. In operation 203, the subscriber agent 222 requests authorization from the subscriber 224 (user/subscriber). In operation 204, the subscriber 224 provides owner credentials and authorization (if the request is approved) to the subscriber agent 222. In operation 205, the subscriber agent 222 relays the owner credentials and approval to the authorization server 120.

In operation 206, the authorization server 120 provides an authorization code. In operation 207, the subscriber agent 222 relays the authorization code to the client application 220. The redirection URI includes the authorization code and any local state previously provided by the client application 220.

In operation 208, the client application 220 requests an access token 250 from the authorization server 120 through the token endpoint. The client application 220 authenticates with its client credentials and includes the authorization code received in the previous operation 207. The client application 220 also includes the redirection URI used to obtain the authorization code for verification. The authorization server 120 validates the client credentials and the authorization code. The authorization server 120 also ensures that the redirection URI received matches the URI used to redirect the subscriber agent 222. In operation 209, if the information received from the client application is valid, the authorization server 120 responds back 209 with an access token 250.

In operation 210, the client application 220 then provides the access token 250 to the resource server 130. Service interceptors 140 verifies that the access token 250 contained is valid before resource server 130 completes the request. In operation 211, if the request and token are valid, resource server 130 responds 211 with the requested access to the specified protected communication services 110 with the specified scope and parameters. The communication services being an application programming interface which exposes subscriber information such as charging capability, location, and profile.

Note that in the embodiment illustrated in FIG. 2, the implementation provides a co-located authorization server and authentication server. However, in alternative embodiments authorization server 120 includes an authentication interface (not shown) defining a custom authentication/authorization flow supporting the separation of authentication and subscriber interaction from authorization in a services gatekeeper system. Using this feature, the services gatekeeper can integrate any authentication mechanism available in the world (for e.g., Facebook/Google/Subscriber or a custom identity management product). This feature enables operators of the system to use their own custom identity management systems or delegate the authentication service to a third party (e.g., Facebook Facebook/Google/Subscriber or a custom identity management product). When a client application requests access to protected subscriber resources, the services gatekeeper can communicate with a third party authentication server via a custom protocol to authenticate the subscriber's credentials. Once authorized, the authentication server can notify the services gatekeeper system which then grants the application access to the requested protected communication services as previously described. See, U.S. patent application Ser. No. 13/557,476, filed on Jul. 25, 2012, now U.S. Pat. No. 8,782,411, issued on Jul. 15, 2014, entitled "SYSTEM AND METHOD OF EXTENDING OAUTH SERVER(S) WITH THIRD PARTY AUTHENTICATION/AUTHORIZATION" by Nimashakavi, et al. which is hereby incorporated herein by reference.

Figure 3:
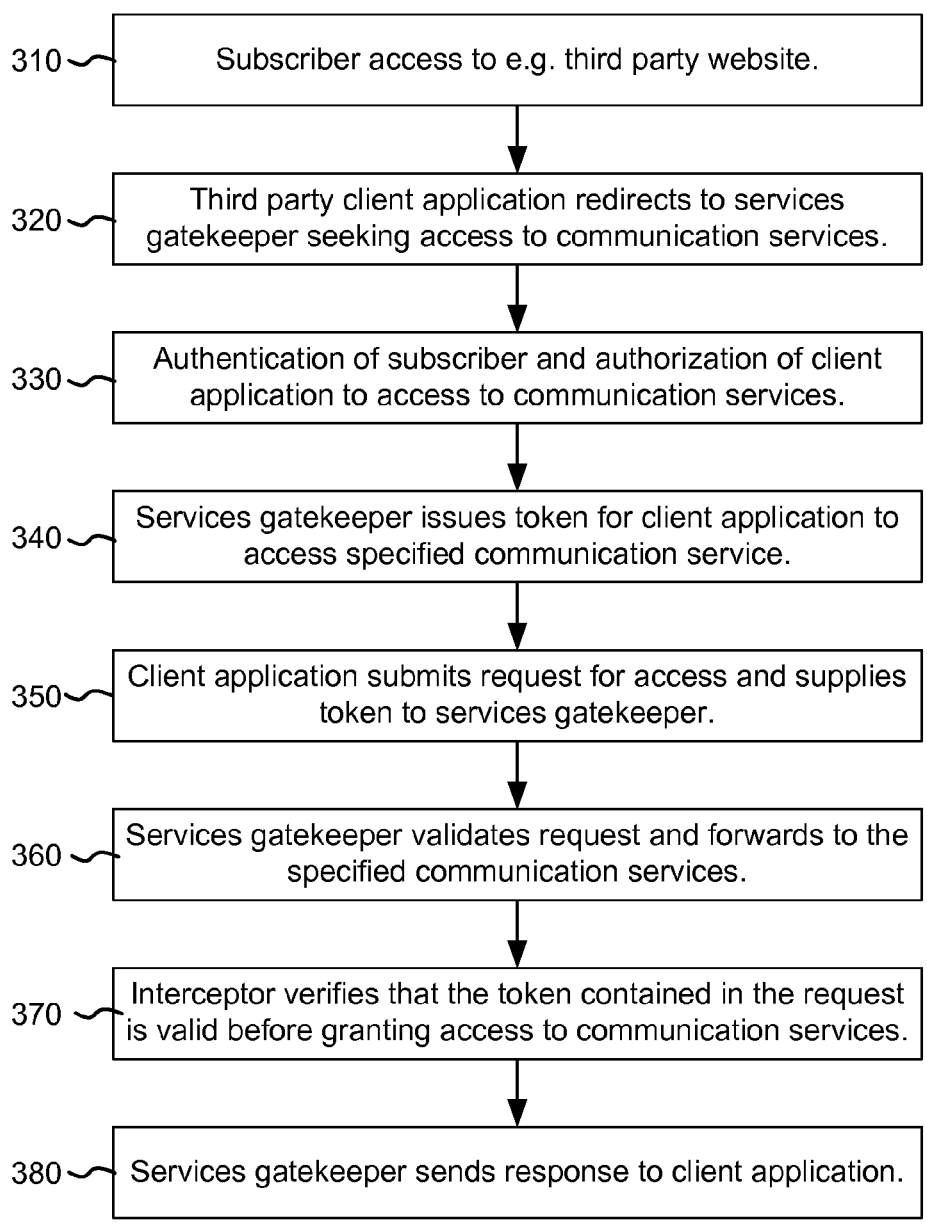
FIG. 3 shows a method for authorizing access to protected services, in accordance with an embodiment of the invention.

FIG. 3, shows a flow chart illustrating access to a communication service 110 through services gatekeeper 100. At step 310 a subscriber accesses, for example, a website premium pay service which wishes to charge for access through a billing service provided by the telecommunications network operator (e.g. access a charging API of communication services 110). At step 320, the third party client application of the website redirects the subscriber to services gatekeeper 100 for authentication and authorization. The redirect information identifies the resource to which the third party client application wants access (charging) as well as any parameters. At step 330, as an authorization server, services gatekeeper obtains a subscriber's permission for access the requested resource (charging) with the identified parameters (e.g. charge $5). At step 340, services gatekeeper issues a token allowing access to the resource (e.g. charging) and subresource (e.g. check charge status) with the specified parameters (e.g. $5). At step 350, the third party client application requests access to a protected resource and supplies the token. At step 360, the services gatekeeper checks the request, ensuring that the body contains the needed authorization information. If the request is valid, services gatekeeper forwards the request onto the specified communication service. At step 370, a service interceptors verifies that the token contained in the request is valid before completing the request. At step 380, services gatekeeper then sends a response back to the third party client application.

Although the invention has been described above with respect to communication services in a telecommunications network, the invention also finds application in any situation where its is necessary or desirable to provide secure scoped sharing of API resources which expose user information with user authorization.

The present invention may be conveniently implemented using one or more conventional general purpose or specialized digital computer, computing device, machine, or microprocessor, and/or network of same, programmed according to the teachings of the present disclosure.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. The computer program product can be transmitted in whole or in parts and over one or more public and/or private networks wherein the transmission includes instructions which can be used by one or more processors to perform any of the features presented herein. The transmission may include a plurality of separate transmissions. In accordance with certain embodiments, however, the computer storage medium containing the instructions is non-transitory (i.e. not in the process of being transmitted) but rather is persisted on a physical device.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A system for providing scoped access to subscriber information of a subscriber, comprising:
    an authorization server, executing on one or more processors;
    a plurality of communication services, wherein each communication service includes one or more interfaces, wherein each interface includes one or more methods;
    a flexible data structure, wherein the flexible data structure maps each of the interfaces and methods of a communication service to a resource identifier, wherein the resource identifier and one or more parameters associated therewith identify a scope of information of the subscriber exposed by the communication service;
    wherein the authorization server, when receiving a request including a resource identifier, for accessing the communication service, operates to
        obtain an authorization from the subscriber to access the communication service; and
        in response to receiving said authorization from said subscriber, issue an access token granting access to a particular scope of the information of the subscriber identified by the resource identifier in the request and one or more parameters associated therewith.

2. The system of claim 1, wherein the system further comprises
    a resource server, which, when receiving the access token, validates the access token and enables access to said communication service in accordance with the particular scope identified by the resource identifier in the request and the associated parameters.

3. The system of claim 1, wherein the plurality of communication services include at least a charging interface enabling access to a subscriber billing account and mapped to a charging resource identifier.

4. The system of claim 1, wherein the plurality of communication services include at least a charging interface enabling access to a subscriber billing account and mapped to a charging resource identifier, wherein the charging resource identifier is associated with a parameter for an amount of a charge.

5. The system of claim 1, wherein the plurality of communication services include at least a location interface enabling access to a subscriber location and mapped to a location resource identifier.

6. The system of claim 1, wherein one or more of the resource identifiers are associated with a subresource identifier such that an access token granting access to said communication service in accordance with a particular scope identified by such a resource identifier also grants access to a subresource identified by the subresource identifier.

7. A method for providing scoped access to subscriber information of a subscriber, comprising:
    (a) providing an authorization service, executing on one or more processors;
    (b) providing a plurality of communication services, wherein each communication service includes one or more interfaces, wherein each interface includes one or more methods;
    (c) providing a flexible data structure, wherein the flexible data structure maps each of the interfaces and methods of a communication service to a resource identifier, wherein the resource identifier and one or more parameters associated therewith identify a scope of information of the subscriber exposed by the communication service;
    (d) receiving a request including a resource identifier to access the communication service;
    (e) obtaining an authorization from the subscriber to access the communication service; and
    (f) in response to receiving said authorization from said subscriber, issue an access token granting access to a particular scope of information of the subscriber identified by the resource identifier in the request and one or more parameters associated therewith.

8. The method of claim 7, wherein the method further comprises:
    receiving the access token;
    validating the access token; and
    in response to validating the access token, enabling access to said specified communication service in accordance the particular scope identified by the resource identifier in the request and one or more associated parameters.

9. The method of claim 7,
wherein the plurality of communication services include at least a charging interface enabling access to a subscriber billing account and mapped to a charging resource identifier; and
wherein step (f) comprises in response to receiving said authorization from said subscriber, issuing an access token granting access to said charging interface in accordance with a particular scope identified by the charging resource identifier and one or more parameters associated therewith.

10. The method of claim 7,
wherein the plurality of communication services include at least a charging interface enabling access to a subscriber billing account and mapped to a charging resource identifier, wherein the charging resource identifier is associated with a parameter for an amount of a charge; and
wherein step (f) comprises in response to receiving said authorization from said subscriber, issuing an access token granting access to said charging interface in accordance with a particular scope identified by the charging resource identifier and the parameter for the amount of the charge.

11. The method of claim 7,
wherein the plurality of communication services include at least a location interface enabling access to a subscriber location and mapped to a location resource identifier; and
wherein step (f) comprises in response to receiving said authorization from said subscriber, issuing an access token granting access to said location interface in accordance with a particular scope identified by the location resource identifier and one or more parameters associated therewith.

12. The method of claim 7,
wherein one or more of the resource identifiers are associated with a subresource identifier; and
wherein step (f) comprises in response to receiving said authorization from said subscriber, issuing an access token granting access to said communication service in accordance with a particular scope identified by such resource identifier and one or more associated parameters.

13. A non-transitory computer readable storage medium including instructions stored thereon which, when executed by a computer, cause the computer to perform the steps comprising:
(a) providing an authorization service, executing on one or more processors;
(b) providing a plurality of communication services, wherein each communication service includes one or more interfaces, wherein each interface includes one or more methods;
(c) providing a flexible data structure, wherein the flexible data structure maps each of the interfaces and methods of a communication service to a resource identifier, wherein the resource identifier and one or more parameters associated therewith identify a scope of information of the subscriber exposed by the communication service;
(d) receiving a request including a resource identifier to access the communication service;
(e) obtaining an authorization from the subscriber to access the communication service; and
(f) in response to receiving said authorization from said subscriber, issue an access token granting access to a particular scope of information of the subscriber identified by the resource identifier in the request and one or more parameters associated therewith.

14. The non-transitory computer readable storage medium of claim 13, wherein the instructions stored thereon, when executed by a computer, further cause the computer to perform the steps comprising:
receiving the access token;
validating the access token; and
in response to validating the access token, enabling access to said specified communication service in accordance the particular scope identified by the resource identifier in the request and one or more associated parameters.

15. The non-transitory computer readable storage medium of claim 13,
wherein the plurality of communication services include at least a charging interface enabling access to a subscriber billing account and mapped to a charging resource identifier; and
wherein, in response to receiving said authorization from said subscriber, an access token is issued granting access to said charging interface in accordance with a particular scope identified by the charging resource identifier and one or more parameters associated therewith.

16. The non-transitory computer readable storage medium of claim 13,
wherein the plurality of communication services include at least a charging interface enabling access to a subscriber billing account and mapped to a charging resource identifier, wherein the charging resource identifier is associated with a parameter for an amount of a charge; and
wherein, in response to receiving said authorization from said subscriber, issuing an access token granting access to said charging interface in accordance with a particular scope identified in the charging resource identifier and the parameter for the amount of the charge.

17. The non-transitory computer readable storage medium of claim 13,
wherein the plurality of communication services include at least a location interface enabling access to a subscriber location and mapped to a location resource identifier; and
wherein, in response to receiving said authorization from said subscriber, issuing an access token granting access to said location interface in accordance with a particular scope identified in the location resource identifier and one or more parameters associated therewith.

18. The non-transitory computer readable storage medium of claim 13,
wherein one or more of the resource identifiers are associated with a subresource identifier; and
wherein, in response to receiving said authorization from said subscriber, issuing an access token granting access to said communication resource and said subresource in accordance with a particular scope identified in such a resource identifier and one or more parameters.

* * * * *

UNITED STATES PATENT AND TRADEMARK OFFICE
CERTIFICATE OF CORRECTION

| | | |
|---|---|---|
| PATENT NO. | : 9,009,787 B2 | Page 1 of 1 |
| APPLICATION NO. | : 13/557478 | |
| DATED | : April 14, 2015 | |
| INVENTOR(S) | : Nimashakavi et al. | |

It is certified that error appears in the above-identified patent and that said Letters Patent is hereby corrected as shown below:

In the Specification

In column 9, line 6, delete "its is" and insert -- it is --, therefor.

In the Claims

In column 10, line 67, in Claim 8, after "accordance" insert -- with --.

In column 12, line 16, in Claim 14, after "accordance" insert -- with --.

Signed and Sealed this
Sixteenth Day of February, 2016

Michelle K. Lee
*Director of the United States Patent and Trademark Office*